Dec. 25, 1951     C. E. ADAMS ET AL     2,580,063
CONTROL MECHANISM FOR FLUID MOTORS Original Filed June 21, 1945     5 Sheets-Sheet 1

INVENTORS
CECIL E. ADAMS
HOWARD V. MILLS
VICTOR V. BLASUTTA
BY
Herschel C. Omohundro
attorney

FIG. 3

INVENTORS
CECIL E. ADAMS
HOWARD V. MILLS
VICTOR V. BLASUTTA
BY Herschel C. Omohundro
Attorney Dec. 25, 1951 C. E. ADAMS ET AL 2,580,063
CONTROL MECHANISM FOR FLUID MOTORS
Original Filed June 21, 1945 5 Sheets-Sheet 4

INVENTORS
CECIL E. ADAMS
HOWARD V. MILLS
VICTOR V. BLASUTTA
BY Herschel C. Omohundro
attorney Dec. 25, 1951 C. E. ADAMS ET AL 2,580,063
CONTROL MECHANISM FOR FLUID MOTORS
Original Filed June 21, 1945 5 Sheets-Sheet 5

INVENTORS
CECIL E. ADAMS
HOWARD V. MILLS
VICTOR V. BLASUTTA
BY
Herschel C. Omohundro
attorney Patented Dec. 25, 1951

2,580,063

UNITED STATES PATENT OFFICE 2,580,063

CONTROL MECHANISM FOR FLUID MOTORS

Cecil E. Adams, Columbus, Howard V. Mills, Piqua, and Victor V. Blasutta, Columbus, Ohio, assignors to The Denison Engineering Company, Columbus, Ohio, a corporation of Ohio Original application June 21, 1945, Serial No. 600,736. Divided and this application August 9, 1949, Serial No. 109,364

6 Claims. (Cl. 121—38)

This application is a division of our copending application, Serial No. 600,736, filed June 21, 1945, now Patent No. 2,561,766 issued July 24, 1951.

This invention relates to improvements in hydraulic presses, more particularly presses embodying controls which are caused to take effect between reciprocations of the press ram, and which have to do especially with operations that are related in some way to the operations of the press.

One of the objects of the invention is the provision of control mechanism for a fluid motor wherein the initiation of a motor reciprocation after the completion of a cycle is effected by pressure fluid directed into the control mechanism from a conductor other than the usual conductor from the pump supplying pressure fluid to the motor.

Another object is the provision of means interlocked with the reciprocations of a ram for moving a work table between successive reciprocations of the ram.

A further object is the provision of valve means actuated in timed relation with work table movements for effecting operation of the motor control mechanism by pressure fluid.

Another object is the provision of means in a press of the character stated for preventing simultaneous ram movement and table movement in either direction of rotation of the latter.

Still another object is the provision in a machine of the character stated of novel and useful work table structural features.

Other objects and features of novelty will appear as we proceed with the description of that embodiment of the invention which, for the purposes of the present application, we have illustrated in the accompanying drawings, in which.

In the drawings we have illustrated a bench type hydraulic press of generally C-shape in which are enclosed the sump or tank which holds the liquid supply, the liquid pump, the motor for driving the pump, the vertically disposed reciprocating fluid motor and valve means for controlling the operations of the fluid motor. A ram 20, directly connected with the piston of the fluid motor depends from the overhang of the C-shaped press. On this ram there is carried a rearwardly extending arm 21 which is adapted to engage a collar 22 on a vertically disposed shipper rod 23 when the arm is at the top of its travel.

On the projecting lower member of the C-shaped frame of the press there is mounted the hollow base 24 of a rotary work table construction having a circular table member 25 which rotates step by step and is provided with a plurality of stations each of which assumes a position under the ram in alignment therewith as the table movement progresses. As will appear hereinafter, the table is rotated by a Geneva motion, the actuator of which is driven by a vertical shaft 26 extending upwardly into the table base and driven through reduction gearing by an electric motor 27.

Figure 3:
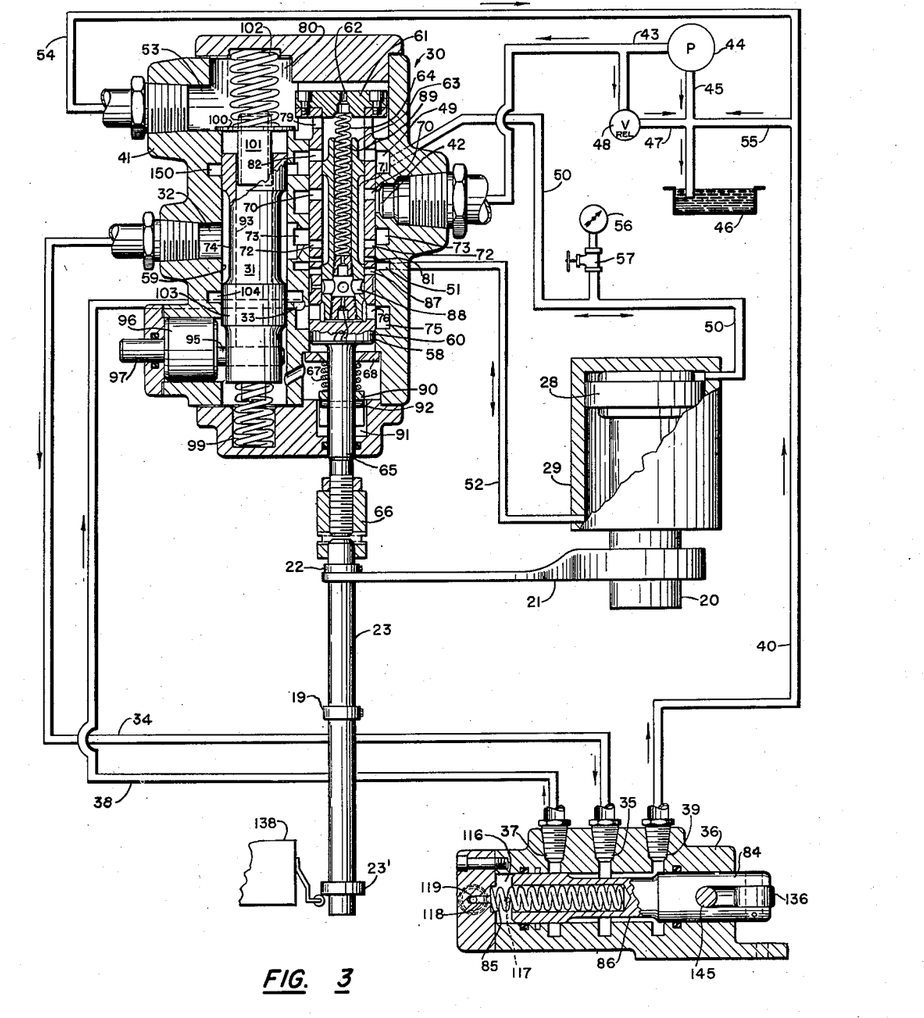
Fig. 3 is a diagrammatic view illustrating certain features of our invention including means associated with a moving table for preventing simultaneous operation of the ram and table moving means.

The ram is attached to a piston indicated at 28 in Fig. 3 which reciprocates in a cylinder 29 mounted in the housing of the press, the parts 28 and 29 constituting a reciprocating fluid motor, the reciprocations of which are governed by a control mechanism indicated generally at 30, which is also located within the housing and may be conveniently attached to the fluid motor, as shown in the copending application of William C. Denison, Jr., Serial No. 562,244, filed November 6, 1944, now Patent No. 2,557,265, issued June 19, 1951.

The control mechanism 30 is similar to that disclosed and claimed in the copending application of Cecil E. Adams, Serial No. 589,163, filed April 19, 1945, now Patent No. 2,491,355, issued December 13, 1949, except that the valve spool 31 differs somewhat from the corresponding part in the said application. Also in the present invention bore 32 constitutes an exit port from the control mechanism leading to an external circuit for pressure fluid, and port 33 is a return or intake port also connected with the external circuit, whereas in the said copending patent bore 32 is closed by a plug and 33 is merely an internal passage.

Exit port 32 is connected by a conductor indicated at 34 with the central port 35 in the housing 36 of a three-way valve. A second port 37 in that housing is connected by means of a conductor indicated at 38 with the intake port 33. As will be explained somewhat more in detail hereinafter, the connection of the conductors 34 and 38 by the three-way valve at times when the ram is at the top of its travel, causes pressure fluid to be delivered to the control mechanism through intake port 33 for reversing the pressure and exhaust connections to the power cylinder 29, and thereby causing the ram to begin a cycle of power and return strokes.

Figures 4, 5:
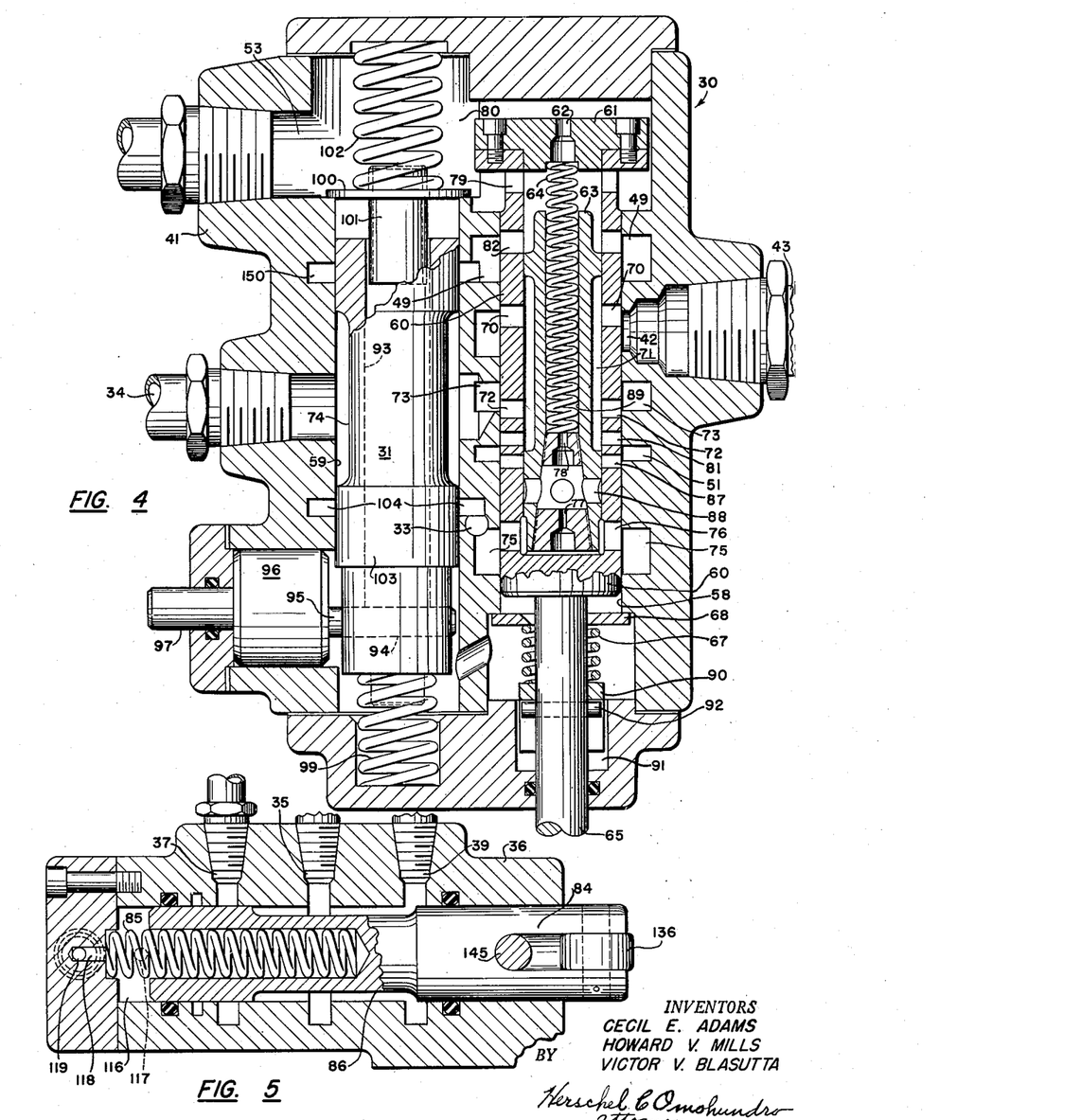
Fig. 4 is a sectional view on a larger scale of the control mechanism illustrated in Fig. 3.
Fig. 5 is a sectional view on a larger scale of the three-way valve shown in Fig. 3.

When the valve spool 31 is set in the position of Figs. 3 and 4 of the drawings the operation of the ram may be controlled by the three-way valve, that is to say the ports 35 and 37 must be put in communication momentarily in order to start a new cycle of ram movements. If it is desired to interpose an idle period between successive reciprocations of the ram it is necessary merely to permit the three-way valve to remain in the position illustrated so that port 35 is connected with a third port 39 from which pressure fluid flows through a conductor 40 leading to tank, either with or without doing useful work enroute.

The three-way valve may be operated manually or automatically. As herein used it is interlocked with the operation of the actuator of the Geneva motion which drives the rotary work table. As will be apparent however, this is but one of many possible automatic applications of the three-way valve.

We will now describe the construction and operation of the control mechanism 30 and its connection with the fluid motor 28, 29, it being understood that for a more detailed disclosure reference should be had to the above mentioned copending application. The casing 41 of the control mechanism is provided with a pressure port 42 which is directly connected by conductor 43 with a liquid pump 44 that draws liquid through a conductor 45 from a tank 46. In a by-pass 47 leading from conductor 43 back to tank 46 there is a pressure relief valve 48 of conventional form which limits the pressure that may be delivered to the control mechanism. From an annular cavity 49 in the casing 41 a conductor 50 extends to the upper end of cylinder 29. Another annular cavity 51 is connected by a conductor 52 with the lower end of cylinder 29. An exhaust port 53 near the top of the control mechanism is connected by conductors 54 and 55 with the tank 46. Conductor 55 also connects with conductor 40, so that exhaust fluid from the three-way valve may be directed back to the tank 46. A pressure gauge 56 may be connected with conductor 50, and is provided with a shut-off valve 57 inasmuch as rapid fluctuations of pressure make it inadvisable to permanently connect the gauge into the line.

The housing 41 of the control mechanism has two valve bores 58 and 59 side by side. In bore 58 there is a slidable sleeve 60 having an integral closure at its lower end and being closed at the top by a cap 61 provided with a central perforation 62. Inside the sleeve 60 there is a hollow shuttle 63 which is biased downwardly by a compression spring 64. Sleeve 60 has a depending stem 65 which is connected by a coupling 66 with the upper end of shipper rod 23. The latter and the sleeve 60 are illustrated in their uppermost position to which they are carried by the ram arm 21 engaging adjustable collar 22. A spring 67 surrounding stem 65 tends to move the sleeve down into engagement with a washer 68 at all times when the lowered position of arm 21 will permit.

In the illustrated position of the parts corresponding to the idle condition of the ram at the top of its travel, pressure fluid may flow from pressure port 42 through radial ports 70 in sleeve 60 into an annular cavity 71 in shuttle 63, and outwardly through radial ports 72 into an annular cavity 73 which connects with the inner end of bore 32. An annular cavity 74 in spool valve 31 connects the inner and outer portions of bore 32. Thus when the sleeve valve 60 is up and the shuttle 63 is down as illustrated, pressure fluid may flow from pressure port 42 to exit port 32 and into conductor 34. When the sleeve is depressed slightly, as it will be immediately after the ram starts down, this path of flow for pressure fluid is cut off by the movement of sleeve ports 72 out of register with the annular cavity 73.

In the position of the parts illustrated in Figs. 3 and 4, live fluid flows from port 42, in the manner just described, through the control mechanism to port 32 and thence to exhaust by way of the three-way valve. Annular cavity 51 is blocked off and pressure fluid is confined within the cylinder 29 below piston 28 to hold the ram raised. At this time the upper end of cylinder 29 is connected with exhaust through conductor 50, annular cavity 49, radial ports 82, the bore of sleeve 60 and radial ports 79 with space 80 at the top of the valve housing, this space communicating with exhaust port 53 and conductor 54 leading to the tank 46. This condition prevails until the plunger 84 of the three-way valve is moved from the position of Figs. 3 and 5 inwardly against coil spring 85 to break the connection between ports 35 and 39 by way of annular cavity 86 and connect ports 35 and 37. Pressure fluid is then caused to flow back to the control mechanism through conductor 38 into port 33.

Port 33 is in communication with an annular cavity 75 in the valve housing which in turn is in communication with radial ports 76 that communicate through the small passages illustrated with the space at the bottom of the shuttle 63. There are constricted passages 77 and 78 in the shuttle which lead to exhaust through the hollow body of the shuttle and through radial ports 79 as well as perforation 62 into the space 80 at the top of the housing which communicates directly with exhaust port 53 and exhaust conductor 54 leading to the tank. However these constricted passages cause pressure fluid from port 33 to accumulate and build up pressure under the shuttle sufficient to shift it upwardly against the action of spring 64. When this occurs the pressure and exhaust connections with cylinder 29 are reversed and the ram is caused to start down.

This reversal takes place in a manner which will now be described.

With the shuttle in its up position the connection of cavity 49 with exhaust, by the ports and passages above described, is cut off. At the same time live fluid is introduced into cavity 49 and thus into the space in cylinder 29 above the piston, that is from pressure port 42 through radial ports 70, annular cavity 71 in the shuttle, and radial ports 82 in the sleeve. The lower part of cylinder 29 is connected with exhaust at this time, that is annular cavity 51 in the valve housing is connected through a set of radial ports 88 in the shuttle and thence through constriction 78 in the shuttle with the bore 89 of the shuttle and through passage 62 in cap 61 to space 80 and port 53 which leads through conductor 54 to the tank. As soon as the ram moves downwardly a fraction of an inch the sleeve 60 will be forced downwardly by spring 67 until stopped by the engagement of a collar 90 with the bottom of a cavity 91 in the housing 41. Collar 90 is vertically slotted part way of its length to accommodate a pin 92 that extends through a transverse bore in the stem 65. When the sleeve 60 is thus forced down ports 72 are carried out of register with annular cavity 73 and pressure fluid is thereby cut off from conductor 34. The introduction of pressure fluid to the space below shuttle 63 is therefore momentary only, but back pressure fluid is supplied thereafter from the space beneath the descending piston 28 and caused to flow through constriction 77 in the shuttle into the space below the shuttle to hold the latter elevated against the action of its spring 64 for so long as the ram continues to descend. As soon as this back pressure is relieved either by the contact of the ram with the work or by the shifting of shipper rod 23 downwardly on account of the arm 21 striking an adjustable collar 19 to pull the sleeve 60 down far enough to cut off the annular cavity 51 from the radial ports 88, then the lack of fluid pressure beneath the shuttle will enable the spring 64 to shift the shuttle downwardly into contact with the bottom of the sleeve, whereupon the pressure and exhaust connections to the fluid motor will be reversed and the ram will travel upward until the arm 21 again raises sleeve 60 to the position illustrated in the drawings, permitting live fluid to exhaust freely through conductors 34 and 40, and leaving pressure fluid trapped within the lower part of the power cylinder to hold the ram in its uppermost position.

Figure 1:
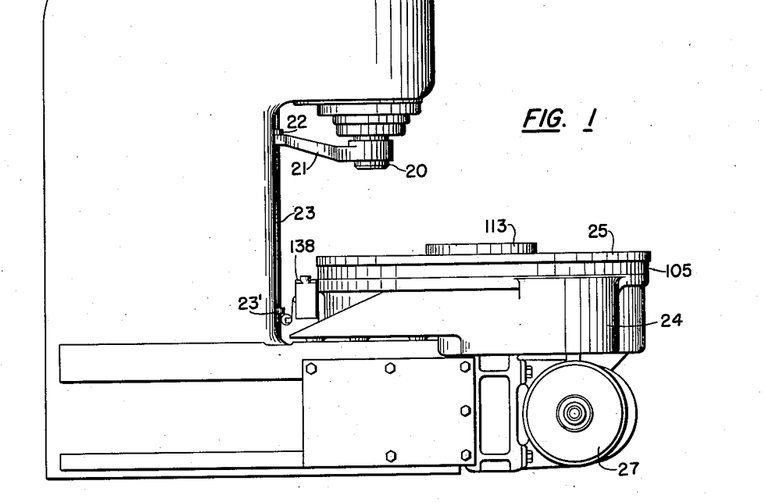
Fig. 1 is a side elevational view of a hydraulic press and rotary work table embodying the invention.
Figures 2, 6:
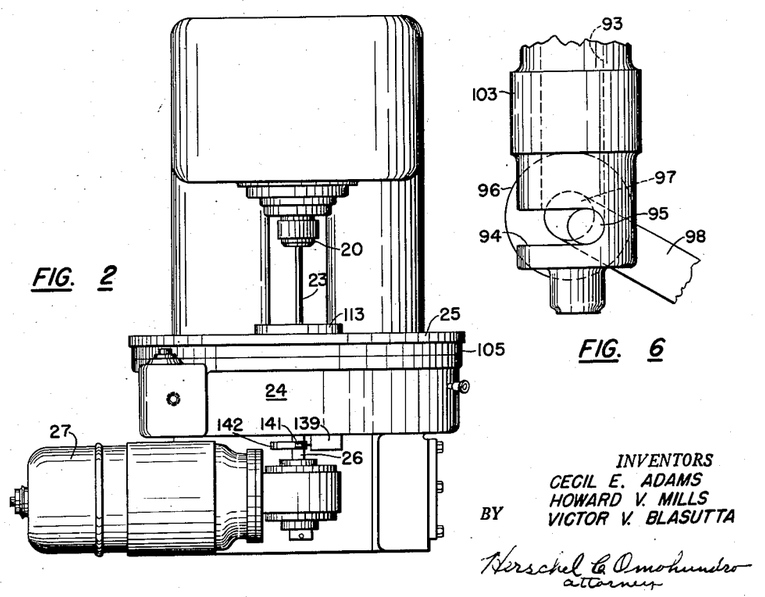
Fig. 2 is a front elevational view of the same.
Fig. 6 is a fragmental view taken at right angles to that of Figs. 1 and 4, showing the lower end of the manual valve in the control mechanism.

Valve spool 31 is manually operated. It is shown in the position in which it is set for automatic or semi-automatic operation involving the three-way valve. This spool has a bore 93 extending from its upper end down to a transverse slot 94 into which there extends a pin 95 that is eccentrically mounted in a trunnion 96 from which there extends a concentric shaft 97 having a handle 98, Fig. 6, for manipulation by the operator. In the position shown the pin 95 holds the spool 31 in a lowered position against the action of a compression spring 99. Inasmuch as pin 95 is thrown over center and into contact with the end of slot 94, as illustrated in Figs. 3 and 6, spring 99 will hold the spool in this position. When the handle 98 is moved toward the left from the position illustrated in Fig. 6 to a position past center, the spring 99 will cause the spool to rise until its upper end contacts a flange 100 on a hollow plunger 101 which is slidable with respect to the bore 93. A coil spring 102 bears against this flange and therefore tends to stop the upward movement of the spool when it comes flush with the upper end of bore 56. Spring 102 is stronger than spring 99. Hence when the handle is thrown to the left beyond center from the Fig. 6 position and then released, the spool will stand with its upper end flush with the upper end of the bore. However, it may be raised above that point by manipulation of the handle. In all positions of the spool 31 except a position in which the spool is raised above the upper end of the bore 59 the land 103 on the spool blocks an annular groove 104 in the housing. However in the highest position of the spool the lower end of land 103 uncovers groove 104 to a slight extent, in which case pressure fluid is exhausted from the space beneath the shuttle by way of the transverse slot 94, bore 93, space 80 and exhaust port 53, this position being provided in order that the operator may at any time stop the downward movement of the ram and cause it to return to its up or idle position.

When the upper end of spool 31 is in engagement with the flange 100 the lower edge of the upper land uncovers an annular cavity 150 in bore 59 connected with cavity 49. When thus positioned and sleeve 60 is moved to open ports 72 to cavity 73, pressure fluid will flow upwardly in cavity 74 through cavity 150 to cavity 49 and thence to tank via ports 82 and 79, cavity 80, port 53 and conductor 54. The fluid will thus by-pass the three-way valve and no pressure will be applied to the underside of the shuttle 63. The ram will therefore remain at rest in an elevated position. A single cycle of ram operation can be secured if desired while the motor 27 is in operation by swinging the handle 98 downward and holding it until the ram starts its cycle, after which the handle 98 may be released.

Figure 7:
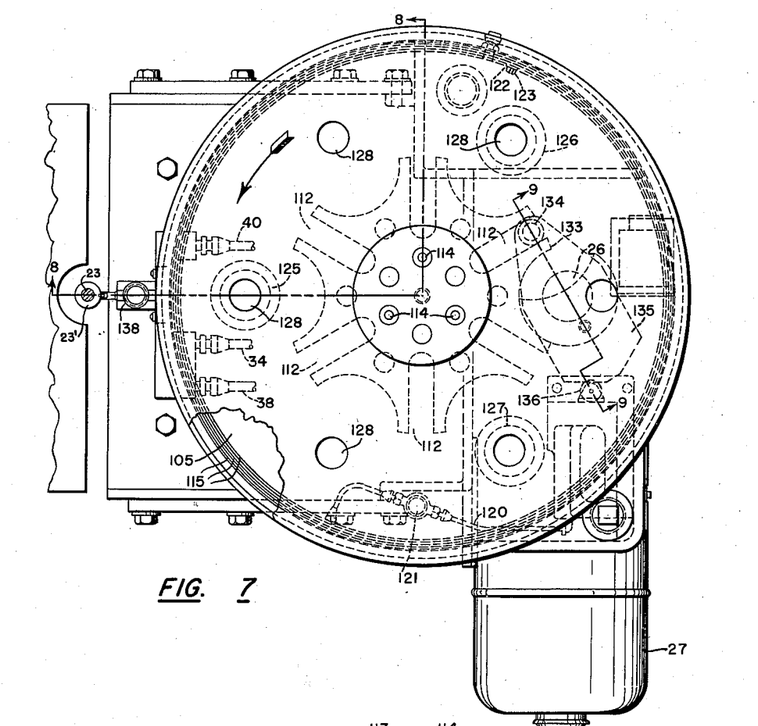
Fig. 7 is a plan view of the work table and a motor driven Geneva motion for rotating the table step by step.
Figure 8:
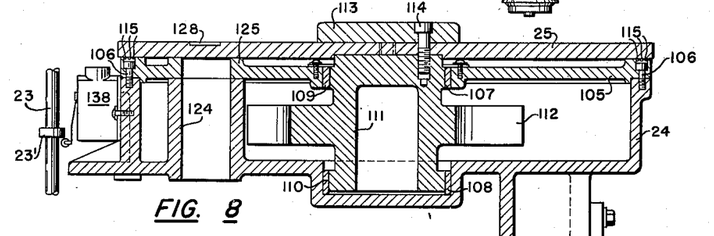
Fig. 8 is a vertical sectional view taken substantially on the line 8—8 of Fig. 7.
Figure 9:
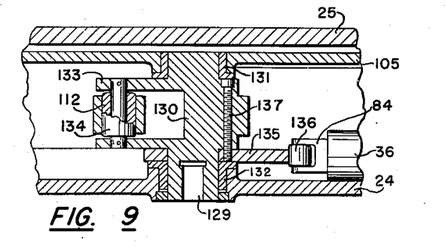
Fig. 9 is a detail sectional view taken substantially on the line 9—9 of Fig. 7.

Referring now to Figs. 7, 8 and 9, it will be noted that the hollow base 24 of the table structure has a separable cover plate 105 which is attached at its periphery to the base 24 by means of a plurality of screws 106 or the like. At the center of this cover plate there is a round opening 107 which is in alignment with the periphery of a cavity 108 in the bottom of the base. Bushings 109 and 110 received within this opening and cavity constitute bearings for a rotatable hub 111 having arms in which are formed radial slots 112, this hub with its radial slots constituting the driven member of a Geneva motion. The rotary table 25 is surmounted at the center with a plate 113 having perforations for the reception of screws 114 which extend through smooth holes in table 25 and into threaded openings in hub 111. Near its periphery cover plate 105 has a raised rim forming a bearing surface for table 25, in which are formed three concentric grooves 115 through which lubricating oil is caused to circulate.

A convenient means for accomplishing this circulation of oil is to utilize the plunger 84 of the three-way valve as a pump plunger. The three-way valve is mounted in the hollow base 24 which serves as an oil sump. A pump chamber 116 is provided at one end of the housing 36. An opening 117 through the housing serves as the intake port of the pump, opening and closing with the plunger movements, while passages 118 and 119 connect with a small tube 120 containing a check valve 121. This tube leads to the middle one of the three grooves 115. At a point diametrically across from this inlet connection with the middle groove the inner and outer grooves are connected with drain passages 122 and 123 through which oil is returned to the sump.

The base 24 of the table structure is provided at three evenly spaced points with cylindrical bearing members 124 open top and bottom and registering respectively with three cylindrical bearing members 125, 126 and 127 in the cover plate 105. These latter bearing members provide a three point support for the rotary table in addition to the peripheral support provided by the rim of the cover plate 105. The bearing member 125 is positioned in alignment with the ram. The table 25 has six stations which are adapted to be brought into alignment one after another with the bearing 125. In the table illustrated these stations consist of small circular cavities 128, but they may take other forms and may in some cases comprise openings through the table, through which punchings may be driven downwardly through the cylindrical bearings 125 and 124 into a suitable container or discharge chute.

The Geneva motion comprises an actuator which rotates continuously, provided motor 27 is in operation. This actuator has a hub 130 which is mounted at its upper and lower ends in bearings formed by bushings 131 and 132 carried in the base 24 and cover plate 105. It has an axial socket 129 in its lower extremity which receives and is keyed to vertical shaft 26 driven by motor 27. Hub 130 has a bifurcated radially extending arm 133 carrying between the bifurcations a roller 134 of a size to fit within the slots 112 of the hub 111. Hub 130 also carries a cam plate 135 which is disposed to engage a roller 136 mounted in the protruding end of plunger 84 of the three-way valve. Cam plate 135 may be adjusted to either of two different positions illustrated in Figs. 10 and 12, and by this means the actuation of roller 136 may be so effected as to time it with the rotation of the table either clockwise or counterclockwise. A pin or screw 137 mounted in the hub 130 takes into an arcuate slot 150 in the cam plate 135 and engages one or the other end of that slot, depending upon the direction of rotation of motor 27. The adjustment of plate 135 thus takes place automatically.

138 is a normally closed limit switch attached to the base 24 opposite shipper rod 23. When the shipper rod is in its uppermost position illustrated in Figs. 3 and 8, at which time the ram is idle, switch 138 is closed. As soon as the ram starts down the shipper rod descends far enough to cause collar 23' to open switch 138.

Figures 10, 11, 12, 13, 14, 15:
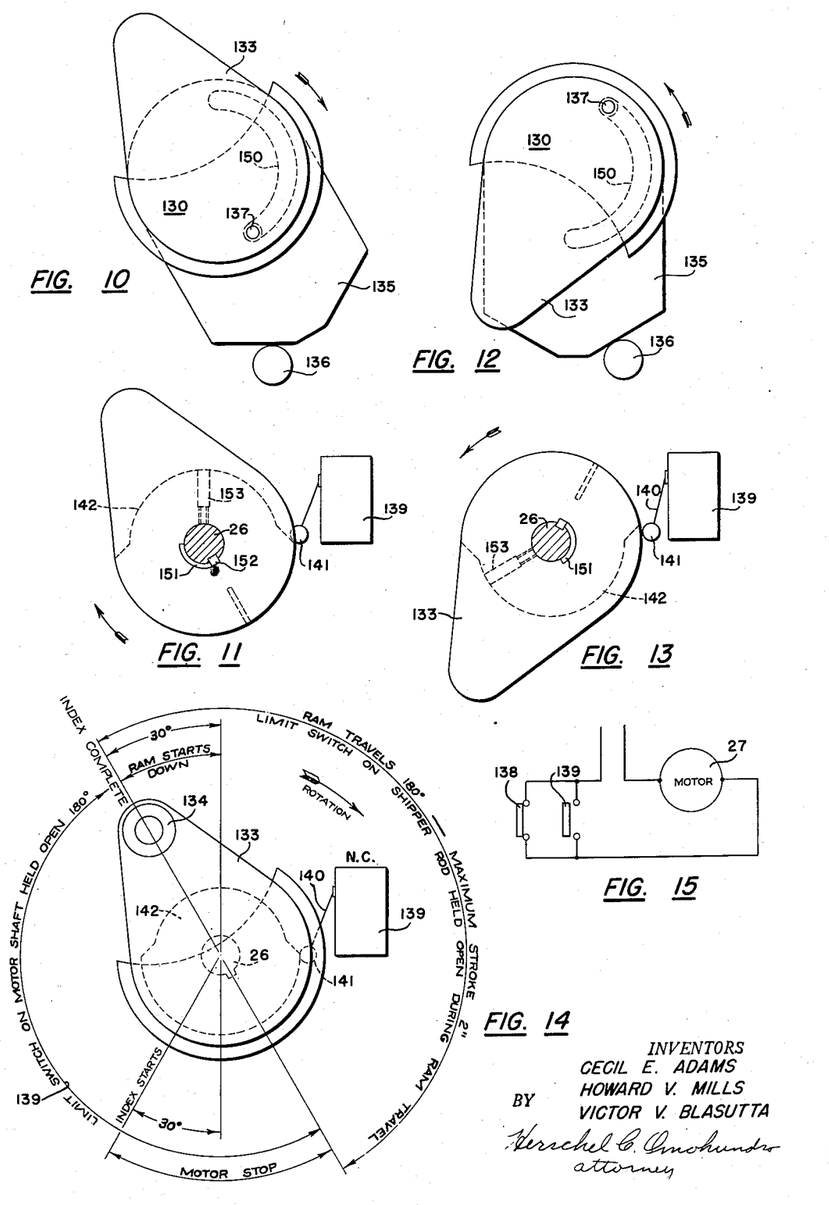
Figs. 10 and 11 are detail plan views of a Geneva motion actuator for rotating the table in a counterclockwise direction.
Figs. 12 and 13 are similar views with the parts disposed for rotating the table in a clockwise direction.
Fig. 14 is a timing diagram illustrating the operation of the actuator in the counterclockwise direction.
Fig. 15 is a wiring diagram illustrating a motor control for the table operating mechanism.

139 is another normally closed limit switch disposed as shown in Fig. 2, the operating arm 140 of which carries a roller 141 that runs upon a cam 142 that has an arcuate slot 151 therein to accommodate a key 152 in shaft 26. Cam 142 may occupy either of two positions with the key 152 engaging one or the other end of slot 151, and it may be held in either of such positions by a set screw 153, as indicated in Figs. 11 and 13. All of the adjustments necessary when the direction of rotation of the motor is changed may therefore be made without dismantling any of the parts.

*Operation*—Starting with the ram in its idle position at the top of its travel, and the control mechanism and three-way valve in the positions illustrated in Figs. 3, 4, and 5, the operation is as follows:

Live fluid is now flowing from pump 44 through the control mechanism 30, conductor 34, port 35 of the three-way valve, annular cavity 86 of plunger 84, port 39 and conductor 40 back to the tank. The plunger 84 is biased to the position illustrated by spring 85 working against a stop 145. The pump is relieved of load. The ram may now be started on its down stroke by moving the plunger 84 to the left in order to cut off port 39 and connect ports 35 and 37 for introducing pressure fluid momentarily into port 33 and thereby lifting shuttle 63, which permits fluid to exhaust from the lower end of cylinder 29 and live fluid to enter the upper end of that cylinder. The ram is thus started on its power stroke.

Plunger 84 may be operated in various ways, including manual operation. As herein shown however, its operation is effected automatically by the actuator of the Geneva motion, which drives the work table 25 step by step. Looking down upon the table, Fig. 7, rotation is in the counterclockwise direction. To accomplish this the actuator rotates in the clockwise direction, as indicated in Figs. 10, 11, and 14. Figs. 7 and 10 show the actuator at the conclusion of a table movement. As the actuator continues to revolve, the cam 135 engages roller 136 and forces plunger 84 into housing 36 against the action of spring 85.

Directly after the ram starts down, the shipper rod 23 descends and with it sleeve 60 causing ports 72 to leave registration with annular cavity 73. The flow of live fluid through conductor 34 to the three-way valve is thus cut off and the entire volume of the pump becomes available to operate the fluid motor.

The ram travels down on its power stroke until it strikes the work or until the ram arm 21 strikes collar 19, at the election of the operator, whereupon the direction of travel of the ram is reversed as previously explained. While this travel of the ram down and up is proceeding the actuator arm 133 is revolving from the position of Figs. 7, 10, 11 and 14 through 180° more or less, depending upon the length of stroke of the ram, which may be varied within limits to suit the work to be done. Switch 138 is open while the ram is moving, but switch 139 is closed during this time or for 180° of movement of the Geneva driver from the position illustrated in Figs. 11 and 14. In case the ram travel is completed in less than 180° of movement of the actuator, the switch 138 will close before switch 139 opens, in which event the motor will operate continuously. In case the stroke of the ram is so long and requires so much time that switch 138 remains open after switch 139 opens, current to the motor will be interrupted and the motor will stop. It is provided with a brake which will bring it to a sudden stop. 60° of actuator movement are provided for effecting this stop, as will be apparent from Fig. 14. The time interval corresponding with this 60° movement has been found to be sufficient for the purpose at the rate of actuator rotation which we have employed in practice. However the angle for motor stopping may be varied if necessary by changing the cam 142 to increase the period during which switch 139 is maintained open. As soon as the ram returns to its uppermost position switch 138 will close and current flow to the motor will be resumed and the actuator will resume movement. Its last 120° of travel is the active part of its movement, that is the part which turns the work table one-sixth of a revolution. This table movement is prevented until after the ram movement has ceased and the switch 138 is closed accordingly. As soon as the table movement is completed, cam 135 actuates roller 136 to provide a pressure impulse for shifting shuttle 63 upwardly, and the next cycle of ram movement begins. These operations continue indefinitely, or until the motor 27 or the motor driving pump 44 is stopped by having its current supply cut off. The operator may also stop the ram temporarily at any time by moving handle 98 from the Fig. 6 position clockwise far enough to release the handle and enable spring 99 to raise spool 31 to the position in which it engages flange 100. Then when the ram reaches the top of its stroke and carries up the sleeve 60 to its illustrated position, thereby connecting ports 72 with annular cavity 73, the three-way valve is by-passed as previously explained and the pressure fluid is returned to tank. The shuttle therefore will remain in its lower position and the ram will not start down. The Geneva motion actuator will then continue to turn and will presently connect conductors 34 and 38, which however, will have no effect of raising shuttle 63 so long as the valve spool 103 is in its raised position, because pressure fluid fed into port 33 will then be exhausted through bore 93 and will prevent the building up of pressure beneath the shuttle sufficient to overcome the action of spring 64. The table movements will therefore continue, but without effect upon the fluid motor which drives the ram. This method of stopping the action of the press will be effective of course only so long as the handle 98 remains in its released position. When emergency reverse is desired, the handle 98 is swung clockwise to its uppermost position and then released by the operator.

In case it proves desirable in any instance to have the work table revolve in the clockwise direction, all that is required is to change the direction of rotation of shaft 26 and adjust the position of cam 135 to that illustrated in Fig. 12 of the drawings. In Figs. 12 and 13 the actuator arm 133 is shown in the position which it occupies at the time it completes a movement of the work table. Immediately thereafter cam 135 actuates roller 136 to provide a pressure impulse for lifting shuttle 63 to begin a ram cycle. Immediately thereafter switch 139 will close, as will be apparent from an inspection of Fig. 13, and the rotation of the actuator through 180° will be insured. Rotation beyond that point will be contingent upon the travel of the ram, as previously explained in connection with the above description of operation for counter-clockwise movement of the table.

With the hydraulic circuit disclosed in Fig. 3 it is also possible to use fluid pressure flowing through line 34 to operate some hydraulic device. For example a ram for ejecting or knocking out blanked or formed pieces from dies carried by the indexing table could be operated by such fluid before it flows into the three-way valve. It is also possible to use fluid flowing from the three-way valve through line 40 to operate such a device if desired.

While the form of embodiment of the present invention as herein disclosed constitutes a preferred form, it is to be understood that other forms might be adopted, all coming within the scope of the claims which follow.

Having thus described our invention, we claim:

1. In combination, a reciprocating fluid motor; control mechanism having valve means movable between positions causing forward and reverse operations and idle periods of said motor; said valve means being responsive to fluid pressure to initiate a cycle of operations of said motor; passage means for conducting fluid from said control mechanism to exhaust when said valve means is in position to cause said motor to remain idle; a three-way valve in said passage means; and a second passage means leading from said three-way valve to said control mechanism to apply fluid to said valve means upon actuation of said three-way valve to initiate a cycle of operations of said motor.

2. In combination, a reciprocating fluid motor, control mechanism therefor comprising pressure responsive means movable to positions to cause operation of the motor through a cycle of power and return strokes and idle periods between cycles, said mechanism having an exit port for live fluid open only when the motor is idle between cycles, said pressure responsive means initiating a cycle of operation of said motor upon the application of fluid pressure thereto, and said mechanism having an intake port in communication with said pressure responsive means, a three-way valve, two conductors leading therefrom to said exit and intake ports respectively, and a third conductor leading therefrom to exhaust, whereby live fluid from said exit port may be directed to exhaust for a portion of each cycle of the motor, and then back to said intake port for starting another cycle.

3. In combination, a reciprocating fluid motor, control mechanism for said motor comprising pressure responsive means movable to positions to cause operation of the motor through a cycle of power and return strokes and idle periods between cycles, said mechanism having an exit port for live fluid open only when the motor is idle between cycles, said pressure responsive means initiating a cycle of operation of said motor upon the application of fluid pressure thereto, and said mechanism having an intake port in communication with said pressure responsive means, a three-way valve, two conductors leading therefrom to said exit and intake ports respectively, and a third conductor leading therefrom to exhaust, said valve being biased to connect said exit port conductor with said exhaust conductor, and means for moving said valve against its bias for connecting said exit and intake ports to start a new cycle of said motor.

4. Control mechanism for a fluid motor comprising reversing valve means formed for communication with a source of fluid pressure, said reversing valve means normally being in position to maintain the motor idle but being responsive to fluid pressure to initiate a cycle of operation of the motor; a fluid flow directing device located remotely from said control mechanism; means for conducting fluid from said control mechanism, when said reversing valve means is normally positioned, to said flow-directing device and from the same to exhaust; and means for conducting fluid from said flow-directing device back to said reversing valve means to initiate a cycle of operation of the motor when said flow-directing device is actuated.

5. Control mechanism for a fluid motor comprising reversing valve means formed for communication with a source of fluid pressure, said reversing valve means normally being in position to maintain the motor idle but being responsive to fluid pressure to initiate a cycle of operation of the motor; a fluid flow directing device located remotely from said control mechanism; means for conducting fluid from said control mechanism, when said reversing valve means normally positioned, to said flow-directing device and from the same to exhaust; means for conducting fluid from said flow-directing device back to said reversing valve means to initiate a cycle of operation of the motor; and power-operated means for acutating said flow-directing device to interrupt fluid flow from said flow-directing device to exhaust and establish fluid flow from said flow-directing device to said reversing valve.

6. Control mechanism for an intermittently operating reciprocating piston type fluid motor comprising reversing valve mechanism formed for movement between positions causing power and return stroke and idle periods of the motor, said reversing valve being normally in position to maintain said motor idle; passage means conducting fluid from said control mechanism to exhaust when said reversing valve mechanism is normally positioned; valve means in said passage; a second passage means leading from said last-mentioned valve means back to said control mechanism; and power-operated means governed by said control mechanism for actuating said last-mentioned valve means to interrupt the flow of fluid to exhaust and direct fluid through said second passage means to said control mechanism to actuate said reversing valve and initiate a cycle of operation of said motor.

CECIL E. ADAMS.
HOWARD V. MILLS.
VICTOR V. BLASUTTA.

REFERENCES CITED

The following references are of record in the file of this patent:

UNITED STATES PATENTS

| Number | Name | Date |
| --- | --- | --- |
| 2,013,754 | Hanney | Sept. 10, 1935 |
| 2,253,617 | Griffith | Aug. 26, 1941 |
| 2,388,716 | Svenson | Nov. 13, 1945 |